June 15, 1937.    R. S. BEGG    2,083,937
FLEXIBLE CONDUIT
Filed May 17, 1934
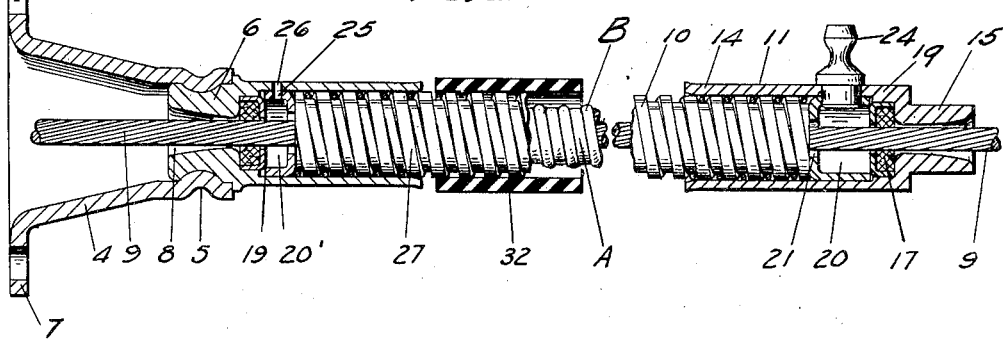
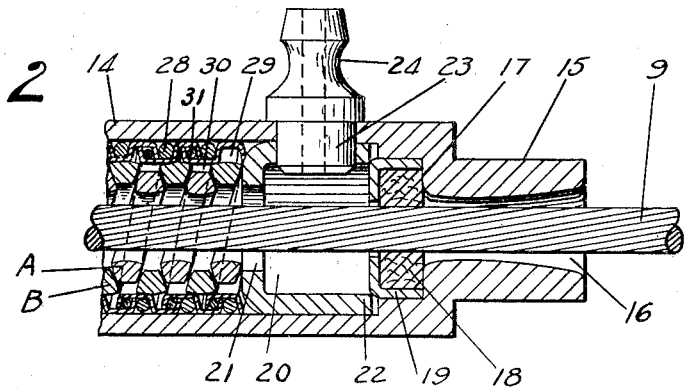
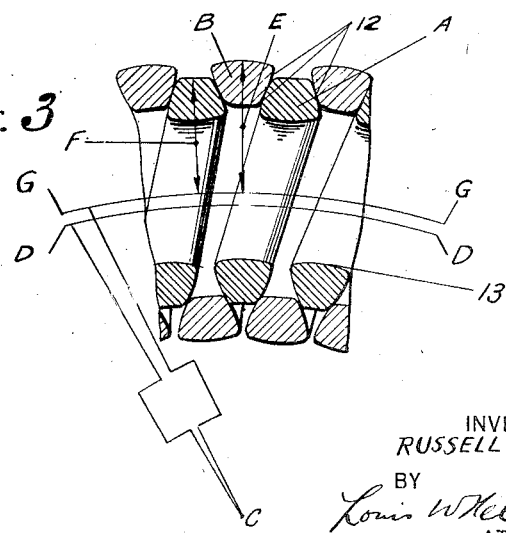
INVENTOR
RUSSELL S. BEGG.
BY
Louis W. Helmuth
ATTORNEY Patented June 15, 1937

2,083,937

UNITED STATES PATENT OFFICE 2,083,937

FLEXIBLE CONDUIT

Russell S. Begg, Cleveland, Ohio, assignor to The Midland Steel Products Company, Cleveland, Ohio, a corporation of Ohio Application May 17, 1934, Serial No. 726,106

9 Claims. (Cl. 74—501)

This invention relates to new and useful improvements in flexible conduits and more particularly to cable conduits of vehicle brake controls.

An important object of the invention is to provide means for insuring lubrication of the conduit and cable slidably mounted therein.

Another object of the invention is to provide means for preventing leakage of the lubricant from opposite ends of the conduit.

A further object of the invention is to provide a protective covering for the flexible conduit with means for preventing distortion and tearing thereof by the action of swaging end fittings thereon.

A still further object of the invention is to provide a flexible incompressible conduit or housing within which is longitudinally moved and laterally supported at least in curvature, a flexible inextensible cable, the length of which does not change when the conduit is in curvature due to the fact that the housing comprises a pair of helically wound strands of such cross section that the sides of adjacent coils slide upon one another substantially transversely of the cable and to substantially equal extents on opposite sides thereof, whereby the housing maintains substantially constant lengths irrespective of whether it is in a straight or curved position.

Other objects and advantages of the invention will become apparent during the course of the following description.

In the accompanying drawing forming a part of the description and wherein like numerals are employed to designate like parts throughout the several views, Fig. 1 is a longitudinal sectional elevation of the improved conduit with parts thereof broken away and others merely in elevation, Fig. 2 is an enlarged longitudinal section of one end of the conduit, Fig. 3 is a further enlarged partial longitudinal section of the two inner helically wound strands of the conduit.

While the improved conduit and cable may be employed generally for transmitting force from one point to another remote point, it is illustrated in the present example of the invention as a vehicle brake mechanism actuator and includes a somewhat frustro-conical housing 4, pressed as at 5 on to an end fitting 6 of the conduit and is secured at its flanged end 7 to a backing plate, not shown, of a brake mechanism mounted within the drum of the vehicle wheel. The end fitting 6 is finished with an outwardly flared mouth 8 for the passage of a spirally wound inextensible wire cable 9, which extends and slides lengthwise through the conduit housing 4 and into the brake drum through an opening in the backing plate for connection with the brake actuating mechanism, usually a toggle for actuating the brake mechanism when the cable is moved longitudinally through the conduit.

One end of the flexible conduit designated in its entirety by the numeral 10 is swaged in the end fitting 6 as will be more particularly pointed out hereinafter, and the other end of the flexible conduit is swaged into another end fitting which is secured to the frame or body of the motor vehicle in any suitable manner and in such position that the end of the conduit associated with fitting 6 extends substantially normal to the backing plate while the other end of the conduit substantially parallels the frame so that the conduit as a whole is curved, but of course the arrangement of end fittings with respect to a brake drum and frame may be such as to dispose of the conduit in a substantially straight path.

The flexible conduit 10 is rendered substantially incompressible by being built up of an inner helically wound metallic strand A and an outer similar strand B wound with a pitch so that its convolutions nest between adjacent convolutions of the strand A as best seen in Fig. 3. The cross sectional shape of both of these strands is substantially trapezoidal with the sides 12 being slightly curved and generated along a line similar to the side of a gear tooth. These side surfaces of the convolutions are adapted to engage and slide on the adjacent surface of its complementary strand when the conduit is bent or in curvature about a center such as C. When the conduit is perfectly straight, the longitudinal centers of the two strands A and B coincide with the longitudinal center line D of the outer convolutions B which have radii equal to E. The inner strand A possesses radii F. When the conduit is in curvature about the center C, the longitudinal center line G of the inner strand shifts outwardly from its coincidence with center line D, due to the outer portions of the convolutions A furthest from the surface B sliding outwardly between adjacent convolutions of strand B while the inner portions of the convolutions A nearest the center C also move outwardly thereby permitting the portions of convolutions B nearest the center to move more closely together while those portions furthest from the center move further apart thereby permitting the convolutions of inner strand A moving transversely of the longitudinal center line D so that the mean effective length of the conduit is not changed in curvature and therefore has no effect upon shortening the cable 9 extending therethrough. The inner surfaces 13 of the strand A are also slightly curved so that the portions of the strand nearest the center C move closer together when the conduit is in curvature and constitute a smooth, substantially continuous surface over which the cable may be drawn without injury.

Each end fitting 6 and 11 has a socket or sleevelike portion 14 terminating at its outer end in a reduced nipple 15 having an outwardly flared bore 16 for the passage of the cable 9. An internal shoulder 17 is provided at the inner end of each nipple to form a seat for a felt packing gasket 18 which is held on the shoulder and closely surrounding the cable by a cup shaped retainer 19 in which the gasket is snugly received. The bottom of this retainer is provided with an opening of course, for the passage of the cable freely therethrough. The conduit being filled with lubricant or grease, these gaskets wipe the cable 9 as it slides through the conduit and end fittings to preclude the escape of lubricant through the nipples of the end fittings.

In order to provide a chamber within each end fitting and at the end of the conduit, a cup shaped spacer 20 having an enlarged opening 21 in its bottom for the free passage of the cable and also of lubricant, is slipped into the end fitting so that the lip 22 of the cup engages against the bottom of the packing retainer 19 and serves to hold the latter in place within a slightly reduced portion of the end fitting. The skirt of the cup is provided with an opening adapted to register with a corresponding one in the side of the end fitting for the reception of the reduced end 23 of a grease fitting 24 whereby lubricant may be injected through this fitting into the cup 20. A cup 20' corresponding to the one just described, is positioned in the end fitting 6 in engagement with the packing retainer 19 and its skirt is provided with an opening 25 registering with a lateral opening 26 in the sleeve of end fitting 6 for the passage of lubricant from the inside of the conduit to its exterior to serve as a tell-tale when the conduit is completely filled with lubricant or grease. If desired, a small relief valve can be mounted in opening 26 whereby the conduit becomes packed with grease under pressure before it is relieved through the opening and valve.

These end fittings 6 and 11 are assembled with the conduit by inserting opposite ends of the strands A and B therein until they abut the bottom of the cups 20 and 20'. The end fittings are secured to this conduit by inserting the ends of a spirally wound metallic covering 27, which encircles the spirally wound strands A and B, into the pockets of the end fittings between the ends of spiral strands A and B and the inner surfaces of the end fittings. By reason of the construction of this metallic covering 27, it has an external spiral groove in which, at each end is inserted a spirally wound strand 28, circular in cross section and highly resistant to compression forces in order to preclude deformation of the ends of the covering when the sleeve portions of the end fittings are swaged down thereon to secure the component parts of the conduit assembly together.

The section of the spiral strand forming the metallic covering 27 is shown in Fig. 2. One edge of this strand has the shape of an inwardly U facing section 28', while the other edge has the shape of a wider, outwardly facing U section 29 so that when the strand is wound spirally, the flanges of the two longitudinal edges are arranged in overlapping relation and are complementary in forming a closed passage in which is inserted a packing cord or strand 31 to prevent any leakage of lubricant should it by any chance get between the strands forming the inner and outer layers of the conduit.

By reason of this assembly, the outer covering layer 27 retains the ends of the spiral strands in thrust engagement with the bottom of the cups 20 and 20' and these in turn are retained in firm contact with the packing retainer cups 19. When the conduit is filled with grease or lubricant, a suitable grease gun is attached to a fitting 24 and lubricant is forced into cup 20 out through its opening 21 into the inner strand A and thence longitudinally through the same until it enters through the perforated bottom of cup 20' to fill the same until it is excluded through the registering openings 25 and 26 to apprise the operator that the conduit is completely filled with lubricant. By reason of the particular cross sectional shape of the strands A and B and the consequent breadth of contact between the respective convolutions thereof, they jointly form a liquid tight grease container and one which does not require as much grease to fill as a conduit of the same internal bore but constructed with strands of circular shape instead of the trapezoidal shape in the drawing.

As the spiral metallic surface 27 is constructed of very light gauge stock, rubber protective sleeves 32 may be slipped thereon to take all wear imposed by the conduit rubbing against adjacent parts of the vehicle.

It will be understood that various changes in the size, shape and arrangement of parts may be resorted to without departing from the scope of the appended claims.

I claim:

1. A flexible conduit for a flexible operating member, end fittings receiving the ends of the conduit in spaced relation to the ends of said fittings to form lubricant chambers at opposite ends of the flexible conduit, a lubricant fitting communicating with the chamber in one end fitting, and the other end fitting having means causing a visible indication when the conduit is full of lubricant.

2. A device of the class described comprising a flexible grease-proof conduit, a flexible cable extending through said conduit, end fittings receiving the ends of said conduit, means for spacing the ends of said conduit from the ends of the fittings to form lubricant chambers at opposite ends of the device beyond the ends of said flexible conduit, a lubricant fitting communicating with the chamber in one fitting, and the other fitting having a lateral lubricant escape opening serving as a telltale for its capacity.

3. A flexible, incompressible conduit having a flexible tension member reciprocable therein, end fittings at opposite ends of the conduit, packings in the end fittings around the flexible member, a lubricant fitting mounted on one end fitting inwardly of its packing, and the other end fitting having means causing a visible indication when the conduit is full of lubricant.

4. A flexible, incompressible conduit having a flexible tension member reciprocable therein, end fittings receiving opposite ends of the conduit, packings in the end fittings around the flexible tension member, a lubricant fitting mounted on one end fitting inwardly of its packing, and the other end fitting having a lateral lubricant escape opening inwardly of its packing.

5. A device of the class described, having an end fitting, a flexible conduit including a spirally wound element having one end housed within one end of the fitting, a flexible operating member extending through said fitting, a cup-shaped spacer sleeve within the fitting having one end abutting the fitting and its other end abutting said conduit and forming a lubricant chamber in said fitting, and a lubricant fitting on the end fitting communicating with said chamber.

6. A device of the class described comprising an end fitting, a flexible conduit including a spirally wound element having one end housed within one end of the fitting, a flexible operating member extending through said fitting, a packing in the outer end of the fitting, a cup-shaped spacer member within the fitting and having a flange abutting said fitting and a bottom abutting said spirally wound element to space the end of said element from the end of said fitting to form a lubricant chamber in the fitting and to retain the packing in position, and a lubricant fitting on the end fitting communicating with said chamber.

7. A device of the class described comprising an end fitting, a flexible conduit including a spirally wound element having one end housed within one end of the fitting, a flexible operating member extending through said fitting, a packing in the other end of the fitting, a cup shaped retainer for holding the packing in place, a second cup shaped spacer within the fitting having its lip contacting with the retainer to form a lubricant chamber, the bottoms of said cups having registering apertures for the passage of the operating member, and a lubricant fitting on the end fitting communicating with said chamber.

8. A flexible force transmitting device comprising a flexible inextensible member and a flexible incompressible housing within which said member is longitudinally moved and laterally supported at least in curvature characterized by the fact that the housing comprises a pair of helically wound strands, each of said strands is substantially trapezoidal in cross section, the inner strand having rounded base surfaces adapted to contact with the inextensible member, the other of the strands being nested with the coil of the first strand and spaced from the inextensible member like radial distances when the device is in a straight line and unlike distances when the device is curved.

9. A flexible conduit assembly including a housing adapted to be attached to a mechanism to be operated by a flexible tension member reciprocable therein, a fitting fixed to the housing and having a lateral lubricant escape opening located exteriorly of the housing and means to preclude the entrance of lubricant into said housing, a flexible conduit having one end attached to communicate with said fitting, a second fitting attached to the other end of the conduit, and a lubricant fitting communicating with said second fitting whereby lubricant can be injected into said conduit until it exudes through said escape opening and is precluded from entering the housing and said mechanism.

RUSSELL S. BEGG.